(12) United States Patent
Pham

(10) Patent No.: US 11,256,660 B2
(45) Date of Patent: Feb. 22, 2022

(54) FORMAT AGNOSTIC DATABASE MIGRATION

(71) Applicant: ZenPayroll, Inc., San Francisco, CA (US)

(72) Inventor: Ngan Duy Pham, Milpitas, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 66 days.

(21) Appl. No.: 16/835,586

(22) Filed: Mar. 31, 2020

(65) Prior Publication Data

US 2021/0303516 A1 Sep. 30, 2021

(51) Int. Cl.
*G06F 16/11* (2019.01)
*G06F 16/182* (2019.01)
*G06F 16/22* (2019.01)
*G06F 16/23* (2019.01)
*G06F 16/21* (2019.01)

(52) U.S. Cl.
CPC .......... *G06F 16/119* (2019.01); *G06F 16/182* (2019.01); *G06F 16/211* (2019.01); *G06F 16/221* (2019.01); *G06F 16/2282* (2019.01); *G06F 16/23* (2019.01)

(58) Field of Classification Search
CPC ............ G06F 9/465; G06F 16/27; G06F 8/65
USPC ......................................................... 707/802
See application file for complete search history.

(56) References Cited

U.S. PATENT DOCUMENTS

| | | | |
|---|---|---|---|
| 10,157,194 B1 * | 12/2018 | Cole | G06F 16/213 |
| 10,678,528 B1 * | 6/2020 | Acheson | G06F 8/60 |
| 2013/0187926 A1 * | 7/2013 | Silverstein | G06F 16/80 |
| | | | 345/440 |

* cited by examiner

*Primary Examiner* — Hung T Vy
(74) *Attorney, Agent, or Firm* — Fenwick & West LLP

(57) ABSTRACT

A staging engine of a staging server receives a request to change a production database from a client device. The staging engine of the staging server accesses one or more schemas corresponding to the production database and determines one or more migration commands based on the received request and the accessed one or more schemas. The one or more migration commands correspond to a difference between a current structure of the production database and a final structure of the production database after the production database is updated. The staging engine transmits the one or more migration commands to a migration engine, wherein the migration engine asynchronously applies changes to the production database according to the one or more migration commands.

19 Claims, 5 Drawing Sheets

FORMAT AGNOSTIC DATABASE MIGRATION

This disclosure relates generally to asynchronous migration tools for making updates and changes to database systems, and more specifically to format agnostic database migration.

BACKGROUND

Generally, a database hosted on a server that is available for access by users may require periodic or routine updates, such as changing the format or manipulating the data of a data table in the database. In order to reduce the amount of down time when access to the database is restricted, a database administrator may use a migration tool to make changes to database asynchronously. The migration tool may make changes to the database without restricting access to the database by making a copy of a portion of the database that is to be changed. The migration tool may then alter the copy of the portion and then manipulate the database to include the altered copy of the portion, while deleting the original portion of the database.

In some cases, a database administrator may make changes on a local copy of a data table of the database that is stored on a client device. The changes may be coded in a file written in a local programming language that is used in a local database management system. Often, the migration tool and the local database management system do not use the same programming language for coding changes to the database. The database administrator may need to manually convert the file written in the local programming language into a file written in a programming language for the migration tool. This can be a complicated and time-intensive process, especially when the local programming language is substantially different from the programming language for the migration tool.

There is a need for a format agnostic method of asynchronously making changes to a database using a migration tool.

SUMMARY

A format agnostic method for asynchronously making changes and/or updates to a database reduces the time and complexity of migrating local changes on a local development/database environment on a client device to a production database on a production server. The format agnostic method eliminates the need for the database administrator to manually adapt or convert the local changes to a format that is compatible with the migration engine.

The format agnostic method includes receiving, by a staging engine of a staging server, a request from a client device to update a production database. The request from the client device may correspond to an update file locally stored on the client device which describes the requested changes and/or updates in a first programming language or format. In some embodiments, the request from the client device includes a direct transmission of the update file to the staging server, and an adapter engine of the staging server generates one or more update commands based on the update file. In other embodiments, the client device generates and transmits the one or more update commands based on the update file to the staging server. The one or more update commands may include a second programming language or format different from the first programming language or format.

The staging engine accesses one or more schemas from a staging database of the staging server, the one or more schemas corresponding to the production database. The one or more schemas define structural organization of data and the relationship between data within the production database, according to some embodiments. Based on the received request and the accessed one or more schemas, the staging engine determines one or more migration commands. In some embodiments, the one or more migration commands include a third programming language different from the first programming language or format and the second programming language or format. The one or more migration commands correspond to a difference between a current structure of the production database and a final structure of the production database after the production database is updated. The staging engine then transmits the one or more migration commands to a migration engine, and the migration engine asynchronously applies changes to the production database according to the one or more migration commands.

Use of the staging engine provides an efficient format agnostic method for a database administrator to migrate local changes from a local development/database environment to a production database, without the need for a user to manually convert the local changes to a specific programming language or format.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

When making changes to a production database on a production server, a database administrator may initially make local changes on a client device remote from the production server using a local database system. The local changes are not applied to the production database until the local changes are migrated from the local database system (e.g., a database system running on a client device) to the production database. In some cases, the local changes are migrated to the production database using a migration tool. The migration tool may accept commands that have a specific format or programming language. If the local changes are coded or described in a different programing language or format than the format or programming language of the migration tool, the database administrator must manually convert the local changes into commands that have the format or programming language of the migration tool.

In a database system environment, a staging server is used to convert a request to update a production database on a production server into one or more migration commands. The staging server transmits the one or more migration commands to a migration engine which asynchronously migrates changes to the production database based on the one or more migration commands, allowing systems, users, and software to access data within the production database as the production database is being updated. The staging server may convert local changes coded in a first programming language into the one or more migration commands. The one or more migration commands are in a programming language or format corresponding to the migration engine. The staging server allows for a database administrator to asynchronously migrate changes to the production database without having to manually convert the local changes into commands for the migration tool. This can save time for the database administrator, as well as mitigate errors that occur during the manual conversion process.

System Architecture

Figure 1:
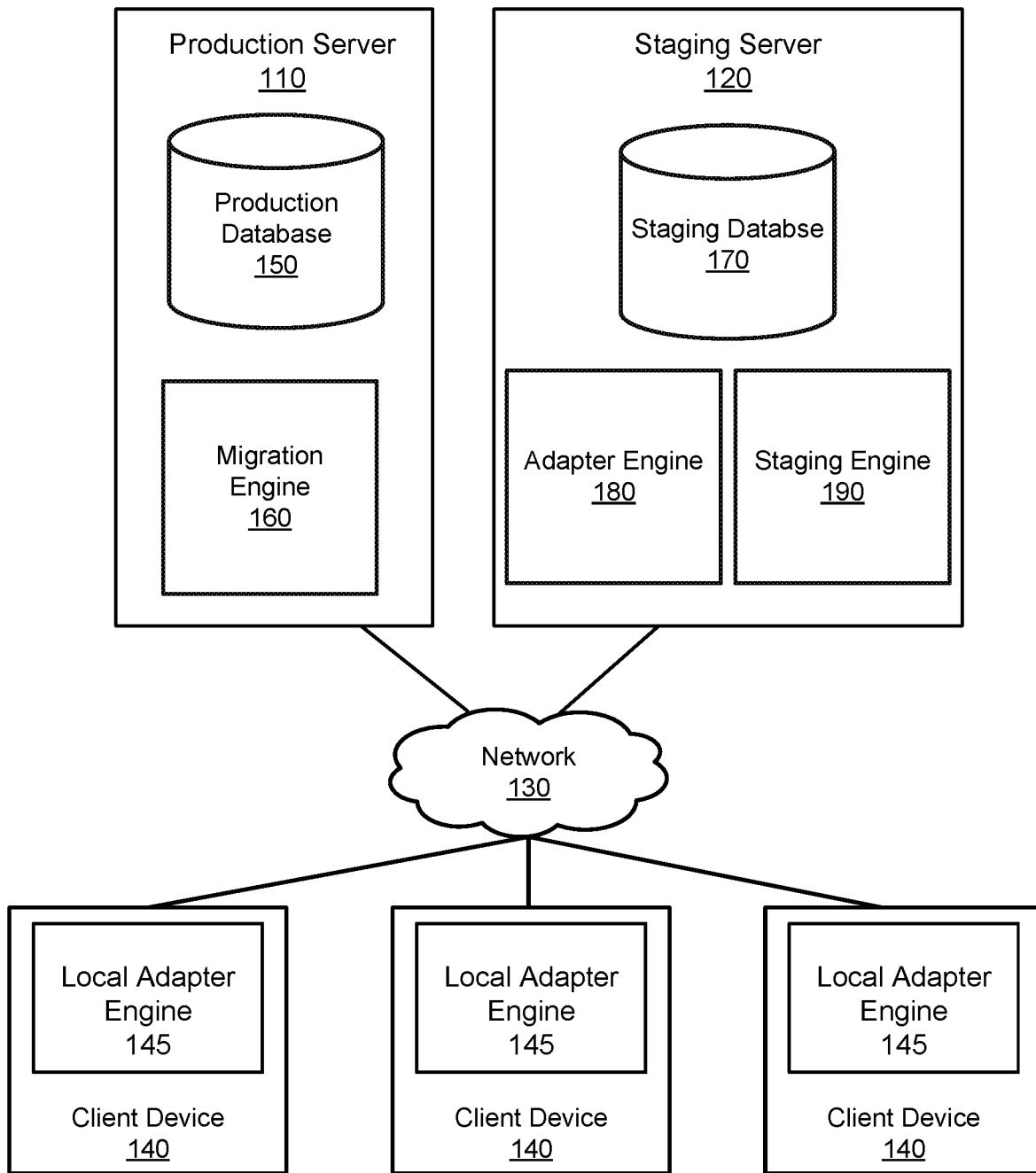
FIG. 1 is a block diagram of a database system environment in which a production server and a staging server operate, in accordance with an embodiment.

FIG. 1 is a block diagram of a database system environment in which a production server and a staging server operate, in accordance with an embodiment. The database system environment 100 shown in FIG. 1 includes a production server 110, a staging server 120, a network 130, and one or more client devices 140. The database system environment 100 may have alternative configurations than shown in FIG. 1 including, for example, different, fewer, or additional components.

The production server 110 stores and maintains a production database 150. The production server 110 includes a migration engine 160 for asynchronously migrating changes to the production database 150. In one embodiment, the production server 110 operates on a central computer or database system, such as a server or set of servers operating within a datacenter. The production server 110 is configured to communicate with a network 130 and may be accessed by client devices 140 via the network 130. Each of the client devices 140 may include a computer system that may include a display and input controls that enable a user of the production server 110 to interact with a user interface for accessing, viewing, and/or manipulating data. The production server 110 shown in FIG. 1 includes the production database 150 and the migration engine 160, but in other embodiments, the production server 110 may contain additional, fewer, or different components for various applications. Conventional components such as network interfaces, security functions, load balancers, failover servers, management and network operations consoles, and the like are not shown so as to not obscure the details of the system architecture.

The production database 150 stores data that can be accessed via the network 130. In some embodiments, the production database 150 includes production data that is provided to client devices (not shown) for a variety of applications. The production database 150 may include production data that is provided for a website or computer application, according to some embodiments. Access to the production data may be required for the website or computer application to function correctly. In such cases, it may be desirable to minimize the down time of the production database 150 when access to data in the production database 150 is restricted.

The client devices 140 are one or more computing devices capable of receiving user input as well as transmitting and/or receiving data via the network 130. In one embodiment, a client device 140 is a conventional computer system, such as a desktop or a laptop computer. Alternatively, a client device 140 may be a device having computer functionality, such as a personal digital assistant (PDA), a mobile telephone, a smartphone, or another suitable device. A client device 140 is configured to communicate with the central enrollment database system 110 via the network 130, for example using a native application executed by the client device 140 or through an application programming interface (API) running on a native operating system of the client device 140, such as IOS® or ANDROID™. In another example, the client device 140 is configured to communicate with the production server 110 and the staging server 120 via an API running on the database system environment 100.

Each client device 140 is configured to request and access data in the production database 150 via the network 130, according to some embodiments. The requested data may be stored as a local copy on a storage device of the client device 140. In some embodiments, a database administrator initially makes local changes on local copies of data tables of the production database 150 on the client device 140, before requesting the migration of the local changes to the corresponding data tables on the production database. The request to migrate changes made on the local copies may be transmitted to the staging server 120 which converts the request into migration commands for the migration engine 160. In some embodiments, manipulations and/or changes representative of the request are coded into an update file. The update file may include a plurality of local commands that are executed by a local database management system on the local client device 140, according to some embodiments. The update file may be written in a first programming language or first format that corresponds to a local development environment or local database management system that is used by the client device 140. For example, the update file may be written in the Ruby programming language.

Each client device 140 includes a local adapter engine 145, according to some embodiments. The local adapter engine 145 receives the update file with the coded manipulations and/or changes to the local copies and determines update commands based on the update file. In some embodiments, the update commands are based on a difference between an initial state of a local copy of a data table of the production database and a final state of the local copy of the data table after the changes have been applied to the local copy. According to some embodiments, the adapter engine 145 compiles the update file and/or runs the update file on an application running on the client device 140 in order to determine the update commands. The client device 140 then transmits the update commands to the staging server 120 as part of the request to change the production database 150. In some embodiments, the update commands are in a second programming language or format different than the first programming language or format of the update file. For example, if the update file is written in the Ruby programming language, the update commands may be in a SQL programming language.

In other embodiments, the client device 140 directly sends the update file to the staging server as part of the request to change the production database 150. In this case, the adapter engine 180 of the staging server 120 converts the changes and/or manipulations coded into the update file into the update commands. According to further embodiments, the adapter engine 180 compiles the update file and/or runs the update file on an application running on the staging server 120 in order to determine the update commands. The adapter engine 180 then provides the update commands to the staging engine 190. In further embodiments, the adapter engine 180 may compile the update file or run the update file in an application hosted on the staging server 120.

The staging server 120 generates migration commands for migrating changes to the production database based on the requests received from the client devices 140. The staging server 120 is configured to communicate with a network 130 and may be accessed by client devices 140 via the network 130. The staging server 120 transmits the migration commands via the network 130 to the production server 110. The staging server stores and maintains a staging database 170. The staging database 170 stores database schemas corresponding to the production database 150. The database schemas define structural organization of data and the relationship between data in the production database 150.

The staging server 120 includes an adapter engine 180, and a staging engine 190. In some embodiments, the adapter engine 180 is configured to receive the requests from the client devices 140 in the form of an update file and convert the changes and/or manipulations described in the update file to update commands. The adapter engine 180 then provides the update commands to the staging engine 190. In other embodiments, as described above, the update commands are generated by the local adapter engine 145 of the client device 140, and the staging server 120 receives the update commands as part of the requests from the client devices 140.

The staging engine 190 interprets the update commands and accesses schemas to generate the migration commands based on the update commands and the accessed schemas. According to some embodiments, the staging engine 190 determines a difference between a current structure of the production database and a final structure of the database after the requested changes to the production database are applied based on the received update commands 220 and the accessed schemas 230. For instance, a first update command can specify a first modification to a structure of the production database (e.g., the removal of a row or column, the addition of a row or column, the merging of multiple database entries or tables, etc.), a second update command can specify a second modification to the structure of the production database, and the staging engine 190 can determine an aggregate modification to the structure of the production database by combining the first and second modifications. The staging engine can then generates the migration commands based on this determined difference in structure. The migration commands instruct the migration engine 160 to asynchronously migrate the changes to the production database such that the production database 150 can be updated.

In one embodiment, the staging server 120 operates on a central computer or database system, such as a server or set of servers operating within a datacenter. The staging server 110 shown in FIG. 1 includes the staging database 170, the adapter engine 180, and the staging engine 190, but in other embodiments, the staging server 120 may contain additional, fewer, or different components for various applications. Conventional components such as network interfaces, security functions, load balancers, failover servers, management and network operations consoles, and the like are not shown so as to not obscure the details of the system architecture.

The migration engine 160 asynchronously migrates changes to the production database 150 based on migration commands received from the staging server 120. Asynchronous migrations of changes to the production database 150 include making changes to the production database 150 without restricting access to the production database 150 or causing the production server 110 from operating normally while the changes are made. For example, if the production database 150 provides data that is displayed on a website, the website will still access the data on the production database 150 and display the data, while the migration engine 160 asynchronously migrates changes to the production database 150.

In some embodiments, the migration engine 160 migrates changes to the database schemas of the production database 150. In other embodiments, the migration engine 160 asynchronously migrates changes to the database schemas, as well as migrating changes to the values of data in the production database 150. According to some embodiments, the migration engine 160 asynchronously migrates changes to the production database 150 by making a migration copy of a portion of the production database 150. The migration engine 160 then makes the changes to the migration copy and changes the address for accessing the portion of the production database 150 to refer to the address of the migration copy. The asynchronous migration performed by the migration engine 160 is discussed in further detail below, with respect to FIG. 4.

In some embodiments, the migration engine 160 accepts migration commands that include a third programming language or format. The third programming language or format corresponding to the migration engine 160 may be different from the first programming language of the update file stored on the client device 140 and the second programming language corresponding to the update commands. For example, the third programming language may be a MySQL based programming language.

The production server 110, the staging server 120, and the client devices 140 are configured to communicate via the network 130, which may comprise any combination of local area and/or wide area networks, using wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Staging Server

Figure 2:
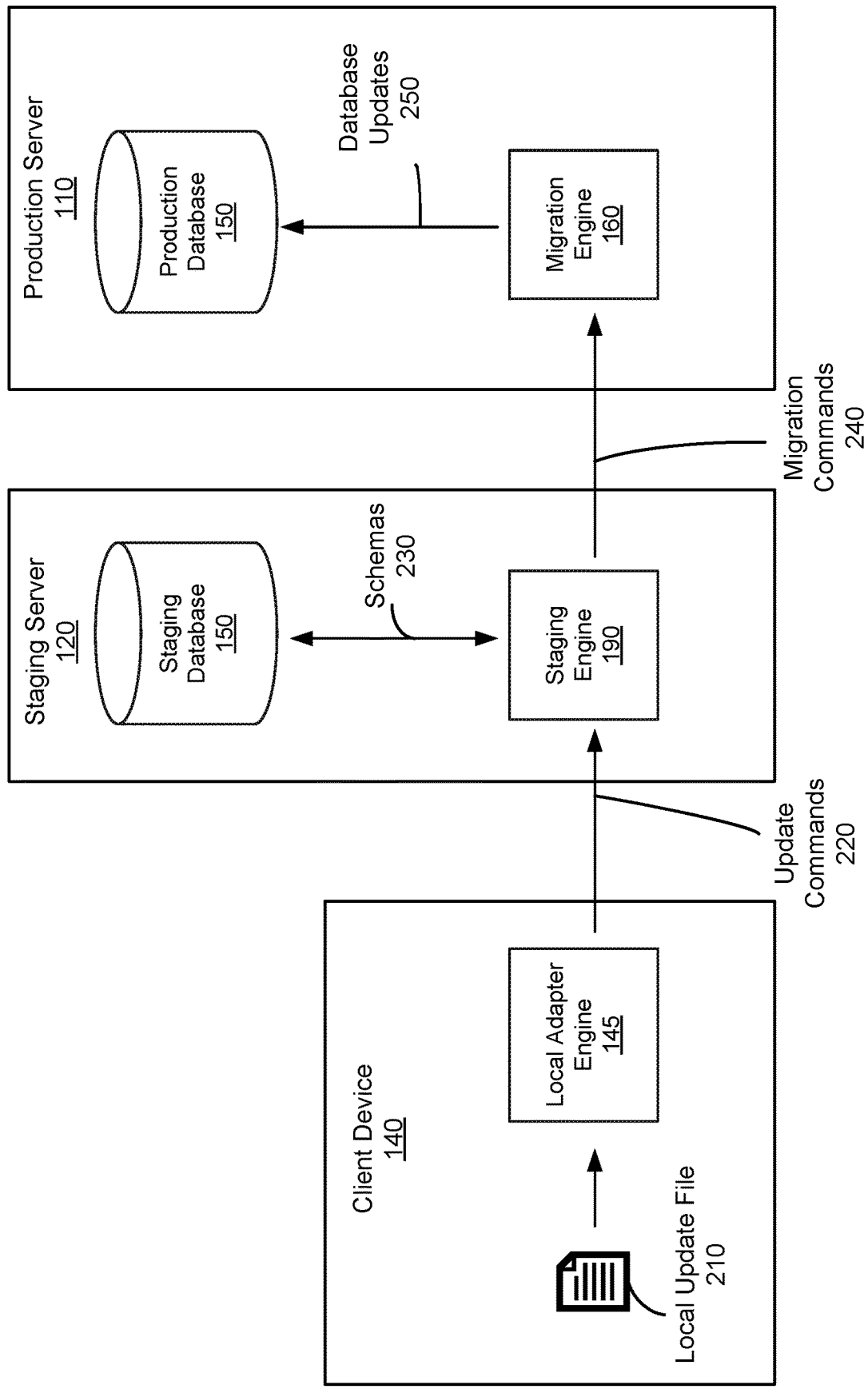
FIG. 2 is an interaction diagram for a staging server of a database system, in accordance with an embodiment.

FIG. 2 is an interaction diagram for a staging server of a database system, in accordance with an embodiment. The interaction diagram 200 of FIG. 2 illustrates aspects of a format agnostic process for migrating changes from a client device 140 to the production database 150. The staging server 120 allows for a database administrator to make changes to the production database 150 without the need to write the commands in the specific programming language of the migration tool being used.

The user codes the requested changes to the production database in a local update file 210 using a client device 140. The local update file 210 may include a first programming language. For example, the first programming language may be Ruby. According to some embodiments, the first programming language may be Ruby, SQL, MySQL, or any other suitable programming language. In some embodiments, the client device 140 stores a local copy of the production database 150 or a portion of the production database 150, and the local update file 210 is used to make changes to the local copy. For example, the local copy may include one or more data tables of the production database 150. The changes to the local copy may be executed by a local database management system on the client device 140 which uses the first programming language. The changes made to the local copy are then migrated to the production server 110 using the staging server 120, resulting in the changes being made to the production database 150.

The local adapter engine 145 receives the local update file 210 and converts the changes to the production database described in the local update file 210 into update commands 220. The update commands 220 may include a second programming language (e.g. SQL). According to some embodiments, the second programming language may be Ruby, SQL, MySQL, or any other suitable programming language. According to some embodiments, the local adapter engine 145 compiles the local update file 210 and/or runs the local update file 210 on the client device 140 in order to determine the update commands 220. For example, the local adapter engine 145 may run an instance of the local database management system and/or an application that accepts the local update file 210 on the client device 145. The instance of the local database management system and/or the application that accepts the local update file 210 may generate outputs that are used to determine the update commands 220. The client device 140 transmits the update commands 220 generated by the local adapter engine 145 to the staging server 120, according to some embodiments.

The staging engine 190 of the staging serer 120 receives the update commands 220 from the client device 140. The staging engine 120 then accesses the staging database 150 to retrieve schemas 230 corresponding to the production database 150. In some embodiments, the staging engine 190 only retrieves the schemas 230 for portions (e.g. one or more data tables) of the production database 150 that are going to be changed, selected based on the received update commands 220. For example, if the update commands 220 specify that a particular data table of the production database will be altered, the staging engine 190 may only access schemas 230 that correspond to that particular data table.

The staging engine 190 generates migration commands 240 for instructing the migration engine 160 of the production server 110 based on the received update commands 220 and the retrieved schemas 230. The migration commands 240 may include a third programming language associated with the migration engine 160. For example, the migration engine 160 may be a GH-OST based migration tool, and the third programming language may be MySQL. According to some embodiments, the third programming language may be Ruby, SQL, MySQL, or any other suitable programming language. Using the staging engine 190, the database administrator does not need to manually convert the changes coded in the local update file 210 in the first programming language to the third programming language. Thus, the staging engine 210 allows for the database administrator to migrate changes to the production database 150, regardless of the programming language or format of the local update file 210.

The staging engine 190 interprets the update commands 220 and determines a difference between a final structure and a current structure of the production database 150. The current structure is determined based on the retrieved schemas 230. The final structure may be determined by interpreting the received update commands 220 and determining the effect to the database structure of applying the changes described in the update commands 220 based on the retrieved schemas 230. The staging engine 190 then generates the migration commands 240. In some embodiments, the migration commands 240 correspond to the determined difference between the final structure of the production database 150 and the current structure of the production database 150. In some embodiments, the migration commands 240 may include a different number of commands than the number of update commands 220 received from the client device 140. Since the migration commands 240 are based on the difference between the final structure and the current structure of the production database 150 after the aggregate of all of the requested changes indicated by the update commands 220 are executed, the migration commands 240 may include different instructions than are indicated by the update commands 220, according to some embodiments. For example, the migration commands 240 may remove redundant steps in the update commands 220 which result in the same final structure of the production database 150, and the migration commands 240 may include fewer steps or instructions than the update commands 220. In other cases, the migration engine 160 may require multiple steps or instructions to perform a change to the production database 150 that is described by only a single step or instruction in the update commands 220, and the migration commands 240 may include a greater number of steps or instructions than the update commands 220.

In some embodiments the staging engine 190 aggregates multiple requests to change the production database 150 and generates the migration commands 240 based on the aggregate of the requests. For example, the staging engine 190 may receive a plurality of update commands 220 that correspond to separate requests to change the production database 150. The staging engine 190 then accesses the schemas 230 and determines the difference between the final structure and the current structure of the production database 150 if all of the requests to change the production database 150 are executed. Based on this difference, the staging engine 190 generates a set of migration commands 240 that corresponds to the aggregate of the multiple requests. According to some embodiments, the plurality of update commands 220 may be received from different client devices 140.

According to some embodiments, the staging engine also updates the schemas 230 in the staging database according to the update commands 220. If the requested changes indicated by the update commands 220 result in a change to the schemas of the production database 150, corresponding changes to the schemas 230 stored in the staging database 150 are made by the staging engine 190.

The staging server 120 transmits the generated migration commands 240 to the production server 110. The migration engine 160 then asynchronously applies database updates 250 to the production database 150 based on the instructions included in the migration commands 240. The database updates 250 may include removing a column of a data table, removing a row of a data table, adding a row of a data table, adding a column of a data table, removing a data table, adding a data table, changing a relationship between one or more data tables, changing a relationship between two or more columns or rows of data tables, and manipulating a value of an entry of a data table, other changes to the production database 150, or some combination thereof. The process of asynchronously applying the data updates 250 by the migration engine 160 is discussed in further detail below, with regard to FIG. 4.

Figure 3:
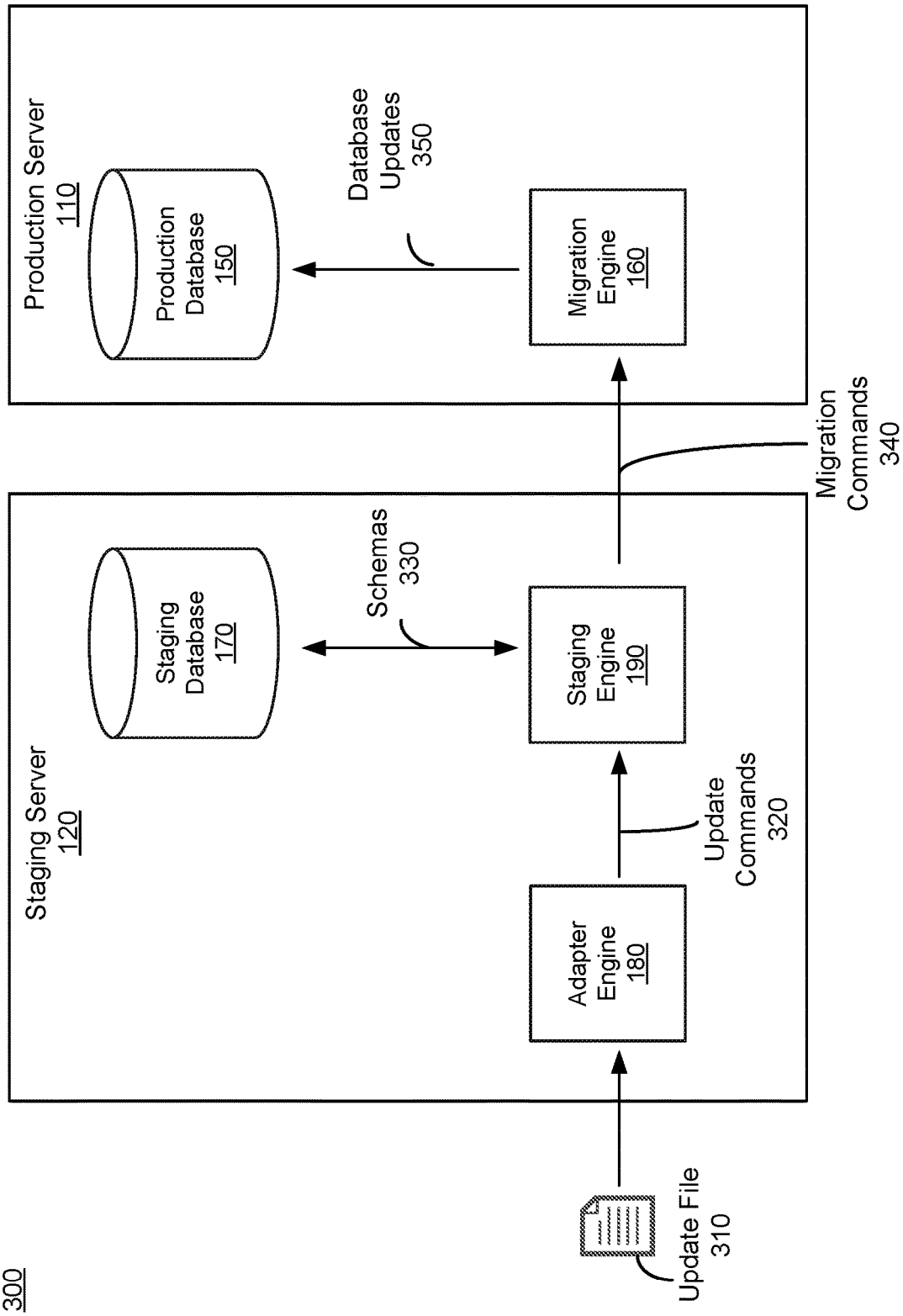
FIG. 3 is an interaction diagram for a staging server of a database system using an adapter engine, in accordance with an embodiment.

FIG. 3 is an interaction diagram for a staging server of a database system using an adapter engine, in accordance with an embodiment. In the interaction diagram 300 shown in FIG. 3, the staging server 120 directly receives the update file 310 as part of the request to change and/or update the production database 110, according to some embodiments.

In some embodiments, the staging server 120 receives the update file 310 directly from a client device 140 (not shown in FIG. 3). In other embodiments, the update file 310 is received from another source. The update file 310 is an embodiment of the update file 210 shown in FIG. 2. The requested changes for the production database 150 are coded in the update file 310 in the first programming language. The adapter engine 180 of the staging server 120 receives the update file 310 and generates the update commands 320 based on the update file 310. The update commands 320 are an embodiment of the update commands 220 shown in FIG. 2. The update commands 320 include a second programming language.

In the embodiment shown in FIG. 3, the adapter engine 180 determines the update commands 320 on the staging server 120, instead of the local adapter engine 145 on the client device 140. This may simplify the process for migrating changes to the production database 150 for the database administrator and allow for the offloading of computing resources to the staging server 120 from the client device 140. According to some embodiments, the adapter engine 180 compiles and/or runs the local update file on the staging server 120 in order to determine the update commands 320. For example, the adapter engine 180 may run an instance of the local database management system and/or an application that accepts the update file 310 on the staging server 120 to determine the update commands 320.

The update commands 320 generated by the adapter engine 180 are received by the staging engine 190. As is described above with respect to FIG. 2, the staging engine 190 accesses the staging database 330 to access schemas 330 corresponding to the production database 150. In some embodiments, the staging engine 190 only retrieves schemas 330 corresponding to relevant portions of the production database 150, based on the update commands 320. The staging engine 190 then generates migration commands 340 for instructing the migration engine 160 based on the update commands 320 and the retrieved schemas 330.

In some embodiments the staging engine 190 aggregates multiple requests to change the production database 150 and generates the migration commands based on the aggregate of the requests. For example, the adapter engine 180 may receive a plurality of update files 310 as part of separate requests to change the production database 150. The adapter engine 180 then generates a plurality of update commands 320 that correspond to the plurality of update file 310. The staging engine 190 then accesses the schemas 330 and determines the difference between the final structure and the current structure of the production database 150 if all of the requests to change the production database 150 are executed. Based on this difference, the staging engine 190 generates a set of migration commands 320. According to some embodiments, the plurality of update files 310 may be received from multiple client devices 140.

The migration engine 160 of the production server 110 receives the migration commands 340 and makes the database updates 350 to the production database 150 based on the instructions of the migration commands 340. The migration engine 160 asynchronously applies database updates 350 to the production database 150 based on the instructions included in the migration commands 340, as described above with respect to FIG. 3. The process of asynchronously applying the database updates 350 by the migration engine 160 is described in further detail below, with respect to FIG. 4.

Migration Engine

Figure 4:
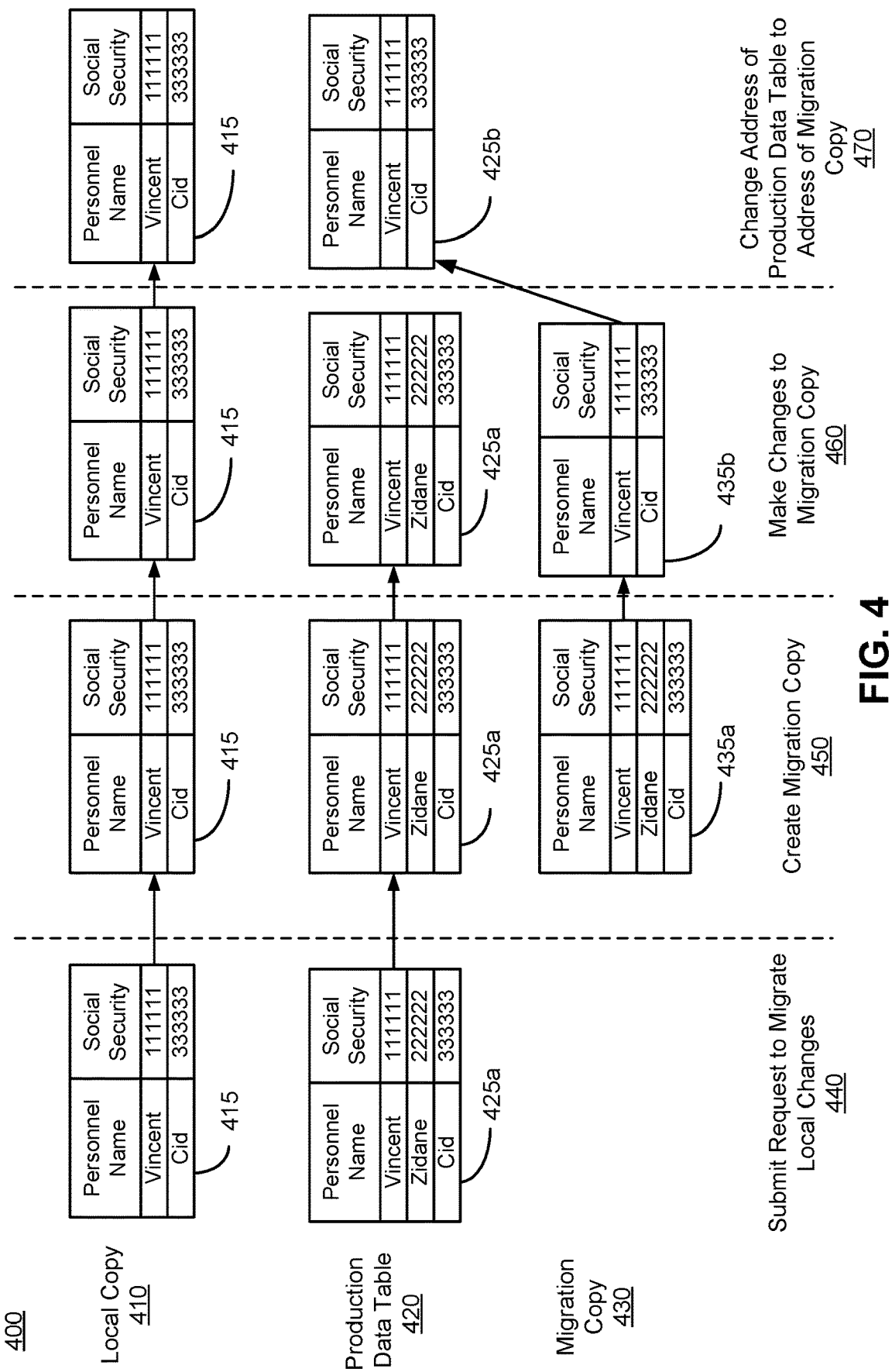
FIG. 4 is an example illustrating asynchronous migration of changes to a data table of a production database in a database system, in accordance with an embodiment.

FIG. 4 is an example illustrating asynchronous migration of changes to a data table of a production database in a database system, in accordance with an embodiment. FIG. 4 shows an example of asynchronous migration 400 including four steps 440-470. The various states of a local copy 410 data table, the production data table 420, and a migration copy 430 are shown in FIG. 4 throughout the four steps 440-470 of the asynchronous migration 400. Each step is shown in FIG. 4 separated by a dashed line.

The local copy 410 data table is stored on the client device 140. The local copy 410 is a copy of the production data table 420 stored in the production database 150. In some embodiments, before the first step 440 (submitting a request to migrate local changes), the local copy 410 is in an initial state (not shown) that is identical to the production data table 420. The migration copy 430 is a copy of the production data table 420 that is generated in the second step 450 (creating the migration copy). The migration copy 430 is used by the migration engine 160 to asynchronously migrate the changes on the local copy 410 to the production data table 420. The migration copy 430 is stored on the production database 150.

In the example of the asynchronous migration 400, local changes are made to the local copy 410 using a client device 140 in the first step 440. The local changes are coded in the form of a local update file stored on the client device 140, and the local update file includes commands representative of the request to change the production data table 420 that are executed by a local database management system on the client device 140. The altered state 415 of the local copy 410 shows the local copy 410 after the local changes have been executed. The initial state (not shown) of the local copy 410 before the local changes are executed corresponds to the initial state 425a of the production data table 420 stored in the production database 150, as is shown in FIG. 4. The initial state 425a of the production data table 420 (and the local copy 410) includes 4 rows (1 row of labels, and 3 rows corresponding to 3 data entries) and 2 columns (1 column corresponding to personnel name data and 1 column corresponding to social security number data for the respective personnel).

In the example of FIG. 4, the local changes consist of the second row (associated with the personnel name Zidane) being removed from the data table, resulting in the altered state 415 of the local copy 410. In the first step 440, the local changes have only been executed on the local copy of the data table, and the production data table 420 is still in the initial state 425a. The database administrator may code the changes and execute them using an update file stored on a client device 140 and a local development environment or database management system, according to some embodiments. The database administrator then submits a request to migrate the local changes to the production data table 420. In some embodiments, the request includes converting the update file into update commands using the local adapter engine 145 and submitting the update commands to the staging server 120, as discussed with regard to FIG. 2. In other embodiments, the request includes submitting the update file itself to the staging server 120, as discussed with regard to FIG. 3.

Upon receiving the request from the client device 140, the staging engine 190 accesses schemas from the staging database 150 that correspond to the production data table 420 and generates the migration commands, as discussed above with regards to FIGS. 2 and 3. In the second step 450, the staging engine 190 submits the migration commands 340 to the production server 110, and responsive to receiving the migration commands, the migration engine 160 creates a migration copy 430 of the production data table 420. The initial state 435a of the migration copy 430 is identical to the initial state 425a of the production data table 420.

In the third step 460 (making changes to the migration copy), the migration engine 160 makes changes to the migration copy 430 based on the migration commands received from the staging engine 190, resulting in the final state 435b of the migration copy 430. The final state 435b corresponds to the local changes to the local copy 410 made using the update file on the client device 140. The final state 435b of the migration copy 430 is identical to the altered state 415 of the local copy 410, according to some embodiments. In other embodiments, the final state 435b is different than the altered state 415 of the local copy 410 and includes other changes aggregated by the staging engine 190. In some embodiments, the instructions and manipulations of the migration copy 430 used to reach the final state 435b of the migration copy 430 are different from the instructions and manipulations of the local copy 410, as coded in the update file.

During the first step 440, the second step 450, and the third step 460, access to the production data table 420 is not restricted, since the changes are made to the local copy 410 and the migration copy 430, without overwriting the production data table 420. This allows for minimal down time of the production database 150.

In the fourth step 470 (changing the address of the production data table to the address of the migration copy), the address for accessing the production data table 420 is changed to the address for the migration copy 430. Thus, when a user, website, or computer application attempts to access the migration data table 420, the migration copy 430 is provided to the user, website, or computer application. The migration copy 430 in the final state 435b then becomes the new production data table 420, resulting in the final state 425b of the production data table 420. In some embodiments, the data table at the former address of the production data table 420 (in the initial state 425a) is then deleted from the production database or stored as a previous version or iteration of the production data table 420. After the successful migration of the local changes, the final state 425b of the production database 425 corresponds to the local changes made on the local copy 410 and the altered state 415.

Since the migration engine 160 never makes changes to the production data table 420, other than changing the address for accessing the production data table 420 in the fourth step 470, the down time when access to the production data table 410 is restricted is minimized, since the fourth step 470 is performed relatively quickly compared to methods where the production data table 420 is directly manipulated without using the migration copy 430. The example shown in FIG. 4 illustrates an embodiment of the asynchronous migration, but, according to other embodiments, the migration engine 160 may perform asynchronous migration using other methods and/or processes than is illustrated in FIG. 4.

Processes for Format Agnostic Migration

Figure 5:
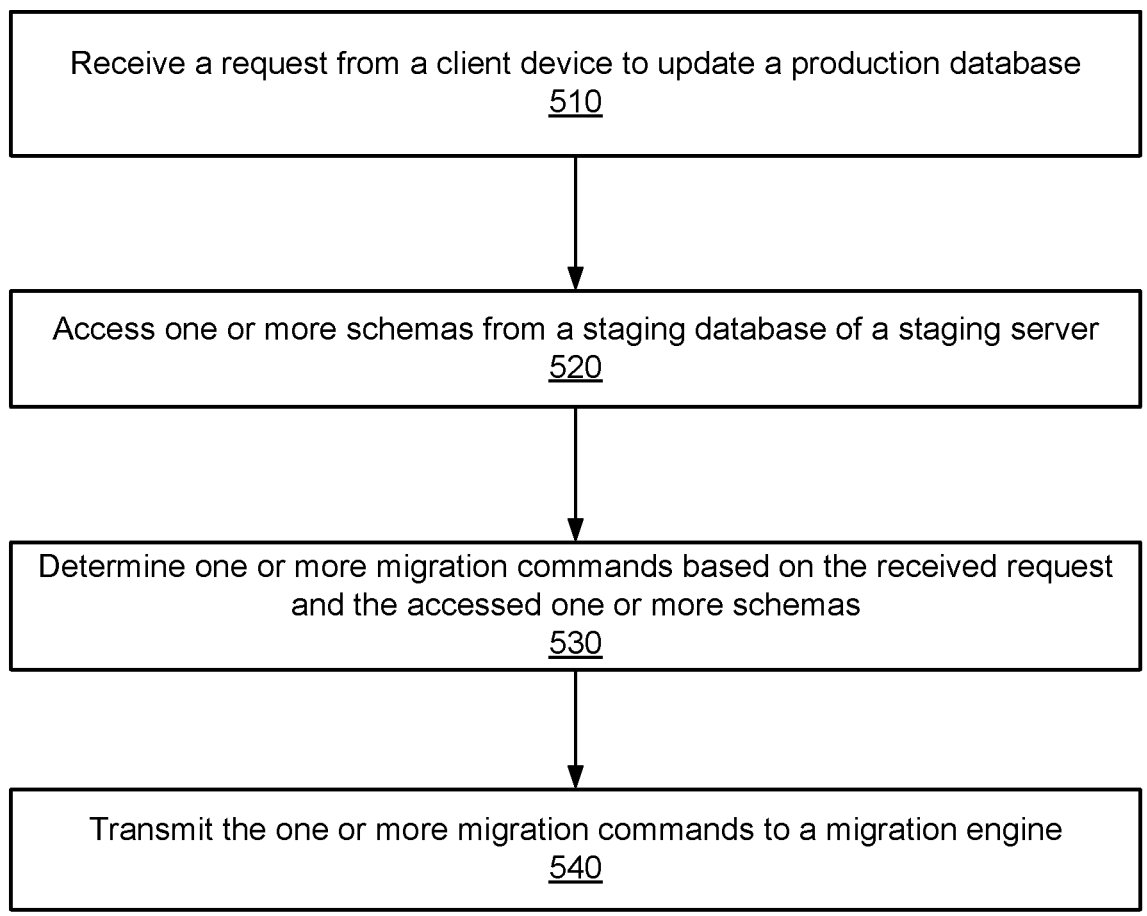
FIG. 5 is a flowchart illustrating a process for a process of format agnostic migrations of changes to a production database in a database system, in accordance with an embodiment.

FIG. 5 is a flowchart illustrating a process for a process of format agnostic migrations of changes to a production database in a database system, in accordance with an embodiment. The process 500 may be performed by the staging server 120. The process 500 includes receiving 510 a request from a client device 140 to update the production database 150. The request from the client device 140 may be in the form of one or more update commands based on an update file stored on the client device, as illustrated in FIG. 2. The one or more update commands may be transmitted to the staging server 120 over a network. In other embodiments, the request includes the client device directly submitting the update file to the staging server 120 over a network, as illustrated in FIG. 3. In some embodiments, the update file includes a first programming language, and the one or more update commands include a second programming language different than the first programming language.

The staging server 120 then accesses 520 one or more schemas from the staging database 170 of the staging server 120, based on the received request from the client device 140. The accessed schemas correspond to portions of the production database 150 that will be updated and/or changed. In some embodiments, the staging server 120 only accesses schemas corresponding to data tables that will be changed and/or updated, based on the request received from the client device 140.

Based on the accessed one or more schemas and the request received from the client device 140, the staging server 120 determines 530 one or more migration commands. The one or more migration commands may include a third programming language different than the first programming language and the second programming language. The staging server transmits 540 the one or more migration commands to the migration engine 160. The migration engine 160 asynchronously migrates changes to the production database 150 based on the one or more migration commands, for example, as discussed above with respect to FIG. 4.

Advantages

Using the staging server to generate the migration commands for the migration engine allows for a format agnostic process for asynchronously migrating changes to a production server. This allows for database administrators to code the changes in a programming language of their choice, without needing to manually convert the changes to a programming language corresponding to the migration engine. For example, the staging server enables a database administrator to code their changes to the database locally in a Ruby programming language and asynchronously migrate the changes to a production server using a migration engine that is not compatible with the Ruby programming language. This saves the database administrator time and effort when migrating changes to the production server. In some cases, the use of the staging server may mitigate errors that occur when a database administrator manually converts local changes into migration commands.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, by a staging engine of a staging server, a request from a client device to update a production database stored by a production server different than the staging engine, the request comprising one or more update commands in a first programming language generated based on an update file received from the client device in a second programming language different than the first programming language;
   accessing, by the staging engine, one or more schemas from a staging database of the staging server, the one or more schemas corresponding to the production database;
   determining, by the staging engine, one or more migration commands based on the received request and the accessed one or more schemas, the one or more migration commands comprising a third programming language different than the first programming language and the second programming language and corresponding to a difference between a current structure of the production database and a final structure of the production database; and
   transmitting, by the staging engine, the one or more migration commands to a migration engine of the production server, wherein the migration engine asynchronously applies changes to the production database according to the one or more migration commands such that the production database is available for access while being updated.

2. The method of claim 1, wherein each of the one or more update commands corresponds to an operation to be performed on a data table of the production database.

3. The method of claim 2, wherein the client device stores a local copy of the data table of the production database, and the one or more update commands comprise operations performed on the local copy of the data table.

4. The method of claim 2, wherein the one or more update commands correspond to at least one of: adding a column to a data table of the production database, removing a column from the data table, adding a row to the data table, removing a row from the data table, changing a value of the data table, and performing an operation on a value of the data table.

5. The method of claim 1, wherein the first programming language is Ruby and the second programming language is SQL.

6. The method of claim 1, the method further comprising:
   determining, by the staging engine, one or more update commands based on the update file, the one or more update commands corresponding to operations to be performed on one or more data tables of the production database.

7. The method of claim 6, wherein determining the one or more update commands comprises running or compiling, by an adapter engine on the staging server, the update file and subsequently extracting update commands from the adapter engine.

8. The method of claim 1, further comprising receiving, by the staging engine, a second request from a second client device to update the production database within a threshold amount of time from the request from the client device, wherein the one or more migration commands are based on both the request from the client device and the second request from the second client device.

9. The method of claim 1, wherein the production server and the staging server are located within a same computing system.

10. A staging server comprising:
   an input configured to receive, from a client device, a request to change one or more data tables of a production database stored by a production server, the request comprising one or more update commands in a first programming language generated based on an update file received from the client device in a second programming language different than the first programming language;
   a staging database comprising one or more schemas corresponding to the one or more data tables of the production database, and
   a staging engine configured to:
      in response to the request from the client device, access at least one of the schemas of the staging database corresponding to the one or more data tables of the production database,
      determine one or more migration commands based on the received one or more update commands and the accessed schemas, the one or more migration comments comprising a third programming language different than the first programming language and the second programming language, and transmit the one or more migration commands to a migration engine of the production server, wherein the migration engine asynchronously applies changes to the one or more data tables of the production database based on the one or more migration commands such that the production database is available for access while being updated.

11. The system of claim 10, wherein the one or more migration commands correspond to a difference between a current structure of the one or more data tables of the production database and a final structure of the one or more data tables of the production database after the one or more data tables of the production database have been changed.

12. The staging server of claim 10, wherein the client device stores a local copy of a data table of the production database, and the one or more update commands comprise operations performed on the local copy of the data table.

13. The staging server of claim 10, wherein the first programming language is Ruby and the second programming language is SQL.

14. The staging server of claim 10, wherein the one or more update commands correspond to at least one of: adding a column to a data table of the production database, removing a column from the data table, adding a row to the data table, removing a row from the data table, changing a value of the data table, and performing an operation on a value of the data table.

15. A non-transitory computer readable storage medium storing executable instructions that, when executed by one or more processors, cause the processor to perform steps comprising:

receiving, by a staging engine of a staging server, a request from a client device to update a production database stored by a production server different than the staging engine, the request comprising one or more update commands in a first programming language generated based on an update file received from the client device in a second programming language different than the first programming language;

accessing, by the staging engine, one or more schemas from a staging database of the staging server, the one or more schemas corresponding to the production database;

determining, by the staging engine, one or more migration commands based on the received request and the accessed one or more schemas, the one or more migration commands comprising a third programming language different than the first programming language and the second programming language and corresponding to a difference between a current structure of the production database and a final structure of the production database; and transmitting, by the staging engine, the one or more migration commands to a migration engine of the production server, wherein the migration engine asynchronously applies changes to the production database according to the one or more migration commands such that the production database is available for access while being updated.

16. The non-transitory computer readable storage medium of claim 15, wherein each of the one or more update commands corresponds to an operation to be performed on a data table of the production database.

17. The non-transitory computer readable storage medium of claim 15, wherein the client device stores a local copy of a data table of the production database, and the one or more update commands comprise operations performed on the local copy of the data table.

18. The non-transitory computer readable storage medium of claim 15, wherein the first programming language is Ruby and the second programming language is SQL.

19. The non-transitory computer readable storage medium of claim 15, wherein the one or more update commands correspond to at least one of: adding a column to a data table of the production database, removing a column from the data table, adding a row to the data table, removing a row from the data table, changing a value of the data table, and performing an operation on a value of the data table.

* * * * *